United States Patent
Riordan et al.

(10) Patent No.: US 6,518,532 B1
(45) Date of Patent: Feb. 11, 2003

(54) METHOD AND APPARATUS FOR JOINING PINS AND WIRES

(75) Inventors: Edward D. Riordan, Somerville; Allan S. Warner, Clark, both of NJ (US)

(73) Assignee: Joyal Products, Inc., Linden, NJ (US)

( * ) Notice: Subject to any disclaimer, the term of this patent is extended or adjusted under 35 U.S.C. 154(b) by 0 days.

(21) Appl. No.: 09/450,253

(22) Filed: Nov. 29, 1999

Related U.S. Application Data

(62) Division of application No. 09/072,676, filed on May 6, 1998, now Pat. No. 5,994,658, which is a continuation of application No. 08/767,992, filed on Nov. 29, 1996, now abandoned.

(51) Int. Cl.[7] .............................................. B23K 11/00
(52) U.S. Cl. ................. 219/56.22; 219/91.21; 219/119
(58) Field of Search ......................... 219/56.22, 56.21, 219/56.1, 85.18, 78.16, 119, 91.21

(56) References Cited

U.S. PATENT DOCUMENTS

| | | | | |
|---|---|---|---|---|
| 1,679,730 A | * | 8/1928 | MacDonald | 219/119 |
| 2,967,228 A | * | 1/1961 | Tindall | 219/119 |
| 3,252,203 A | * | 5/1966 | Alberts et al. | 219/56.1 |
| 3,421,212 A | * | 1/1969 | Chabot | |
| 4,079,225 A | * | 3/1978 | Warner | 219/110 |
| 4,476,372 A | * | 10/1984 | Prucher | 219/119 |
| 4,650,948 A | * | 3/1987 | Riordan | 219/119 |
| 4,687,900 A | * | 8/1987 | Warner | 219/56.22 |
| 4,755,650 A | * | 7/1988 | Riordan | 219/56.22 |
| 4,849,596 A | * | 7/1989 | Riordan et al. | 219/56.22 |
| 5,739,496 A | * | 4/1998 | Asakura et al. | 219/56.22 |

* cited by examiner

Primary Examiner—Clifford C. Shaw
(74) Attorney, Agent, or Firm—Edward Dreyfus

(57) ABSTRACT

A method and apparatus of fusing a pin to a wire to reliably form a good quality fusion joint includes placing the pin and insulated or uninsulated wire in a notch of a lower fusing electrode so that the pin is spaced a predetermined distance above the wire. The upper fusing electrode applies fusing current and heat symmetrically to the pin and notch side walls and the portion of the lower electrode beneath and in contact with the wire. Heat is transferred to soften the pin and burn or vaporize the insulation off the wire before the pin and wire touch. Since all parts are held symmetrically, parts can not skew or burn off un evenly. Electrode pressure builds to drive the soften, heated pin and wire together and to apply fusing current through the contacting pin and wire to form a good fusion joint. Another aspect of the invention includes forming the lower fusing electrode with a plurality of fusing notches to afford quick operator set-up and sequential, automatic fusing of the series of wire/pin assemblies. Openings and channels are formed adjacent the notches to concentrate the fusing heat to the portion in contact with the wire.

10 Claims, 7 Drawing Sheets

METHOD AND APPARATUS FOR JOINING PINS AND WIRES

This is a divisional patent application of application Ser. No. 09/072,676, filed May 6, 1998, now U.S. Pat. No. 5,994,658 which is a continuation of U.S. patent application Ser. No. 08/767,992, filed Nov. 29, 1996, now abandoned.

BACKGROUND

The present invention relates to a method and apparatus for joining electric component pins and electric wires. The invention has great utility in but is not limited to joining insulated magnet wires to multipinned terminal blocks and non-insulated wire strands to multipinned terminals.

The art of joining wires to wires and wires to metal pins is quite old. The art of joining wires to wires to form pigtails or splices includes U.S. Pat. No. 4,687,900 wherein stranded wire 12 is joined to initially insulated magnet wire by placing these wires in the notch of a lower fusing electrode and joining them through the application of pressure, heat, and current through the engagement of the upper fusing electrode. Care is taken to locate the non-insulated stranded wires above and in contact with the insulated magnet wire so that the current path is completed through the wire 12 to the side walls of the lower electrode to generate electrode heat, for burning off the wire 14 insulation and establishing a current and heating path through both wires to be joined. A technical problem associated with this approach results from the wires being unsymmetrically placed or held in the notch. This approach may cause the initial application of fusing current and heat to the insuated wire 14 being unevenly applied to remove or burn off the insulation. This effect would cause non-uniform or unreliable joints from one temination to the next.

Attempts have been made for joining non-insulated wires to pins, however, these attempts experienced reproducability and reliability problems because it was difficult to position the small pin exactly centered on the wire. The pin usually shifted toward one side of the notch or the other causing the initial current to pass more through one notch side wall than the other. This non-symmetrical flow heats the bottom electrode notch and the magnet wire unevenly causing non-uniform results from one termination to the next.

Another technical need in the art relates to the time, costs and inefficiency of setting up to implement the fusing action and the requirement to move or index either the work piece or the upper and lower fusing heads to join a multiplicity of wires to a multiplicity of pins on a single device. Present apparatus require the operator to set up the pin, wire and lower electrode assembly before each fusing operation. This results in a slow, tedious, costly process with high chance of human error that reduces quality and yields from the system.

SUMMARY OF EXEMPLARY EMBODIMENT OF THE INVENTION

The exemplary method and apparatus of the present invention avoids the above mentioned problems and provides new quality and production advantages. According to the principles of the invention, the apparatus includes a lower fusing electrode having a notch with side walls converging to a bottom groove. An insulated or uninsulated wire of predetermined gauge is placed at or near the bottom groove. The metal pin is then placed within the notch. The pin and notch are dimensioned and cooperate so that the pin is initially held spaced above the wire by both side walls of the notch. Preferably, the distance between bottom of the pin and top of the wire is predetermined as described below. To accomplish the fusion joint, the upper electrode contacts the top of the pin, and current is applied by the power control unit. Initial current flows through the upper electrode, through the pin thence through the solid portion of the lower electrode beneath the wire to ground. Because the pin has low resistance and the lower and upper fusing electrodes high resistance, the solid electrode portion beneath the wire heats to burn off the wire insulation and heat the wire. Because the notch walls, wire location at the bottom groove, pin, and upper electrode are all easily symmetrically oriented, the flow of current and heat flows are uniform and uniformly heat the pin and wire. Insulation is quickly and evenly consumed, preferably, before the pin contacts the now bare wire.

As the upper electrode continues to apply downward pressure, heat and current, the pin softens, but does not melt, and is compressed with the now uninsulated wire to form a reliable fusion compression joint.

Another exemplary embodiment includes an extended bottom electrode with a plurality of laterally spaced notches and grooves described above for receiving a plurality of wires and pins. With this embodiment, the operator can set up on a frame the entire pin/wire assembly for the multiplicity of joints. The upper or lower electrode is indexed and stepped relative to the frame so that the operator need only press the start key and the upper head will stop, compress, fuse and withdraw from in lateral sequence each of the plurality of wire/pin joints as described above. This embodiment greatly reduces the set up time and enhances the reliability of wire/pin joint and the uniformity and yield of the final product.

One embodiment of the multinotched lower electrode includes a transverse channel extending along the front and/or rear faces below the fusing notches and an opening defined through the electrode beneath each notch. These channels and/or openings function to concentrate the bottom electrode heat in the region below the notch bottom that is in contact with the wire to be joined.

DRAWINGS

Other and further aspects of and benefits achieved by the present invention will become apparent with the following detailed description when taken in view of the appended drawings, in which.

Figure 8A:
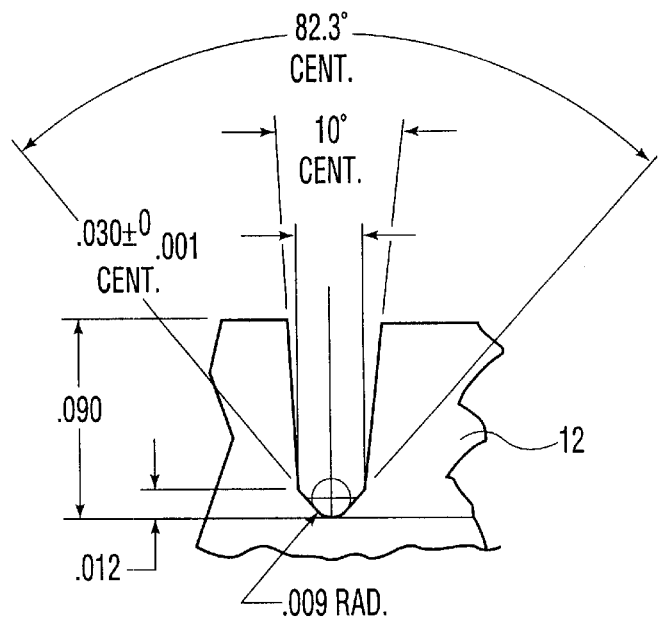
Figure 8B:
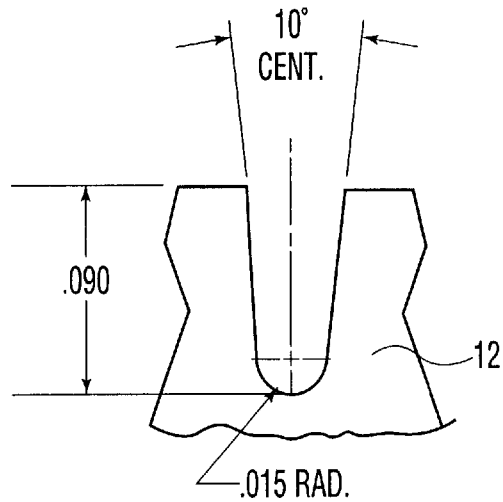
Figure 8C:
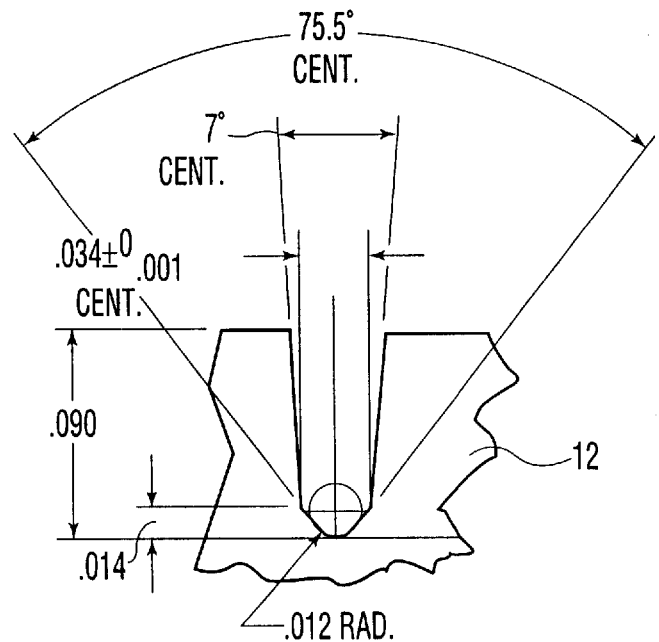

FIGS. 8A, B and C show various notch dimensions, groove angles and dimension for various pin dimensions and wire gauges.

Figure 9:
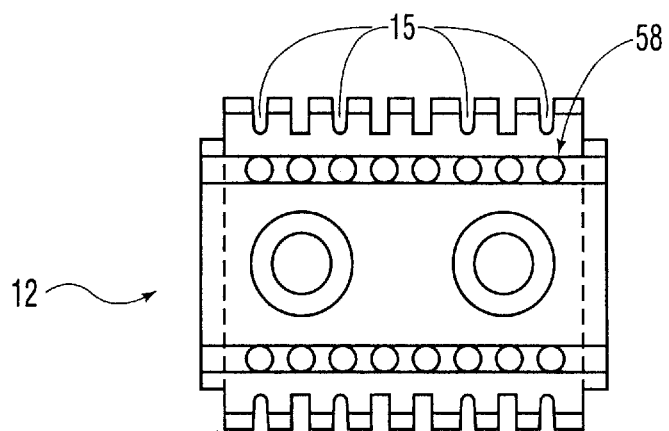

FIG. 9 is a front plan view of a multi-lower electrode according to an exemplary embodiment of the present invention.

Figure 10:
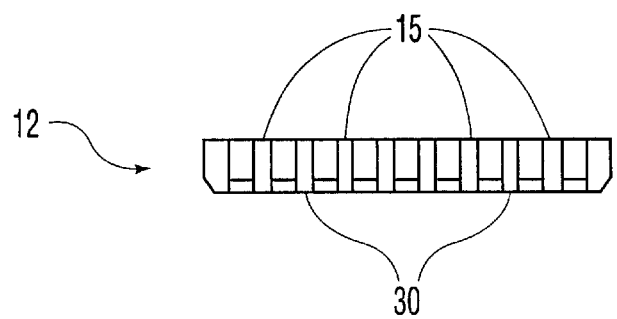

FIG. 10 is a top view of FIG. 9.

Figure 11:
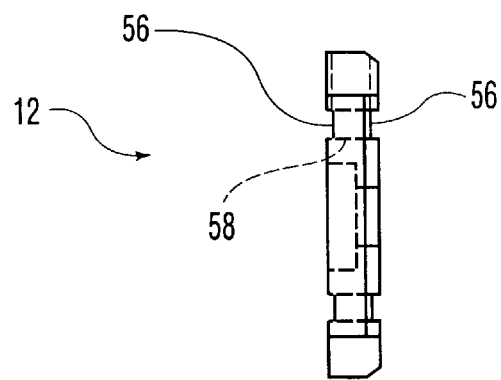

FIG. 11 is a side view of FIG. 9.

Figure 12:
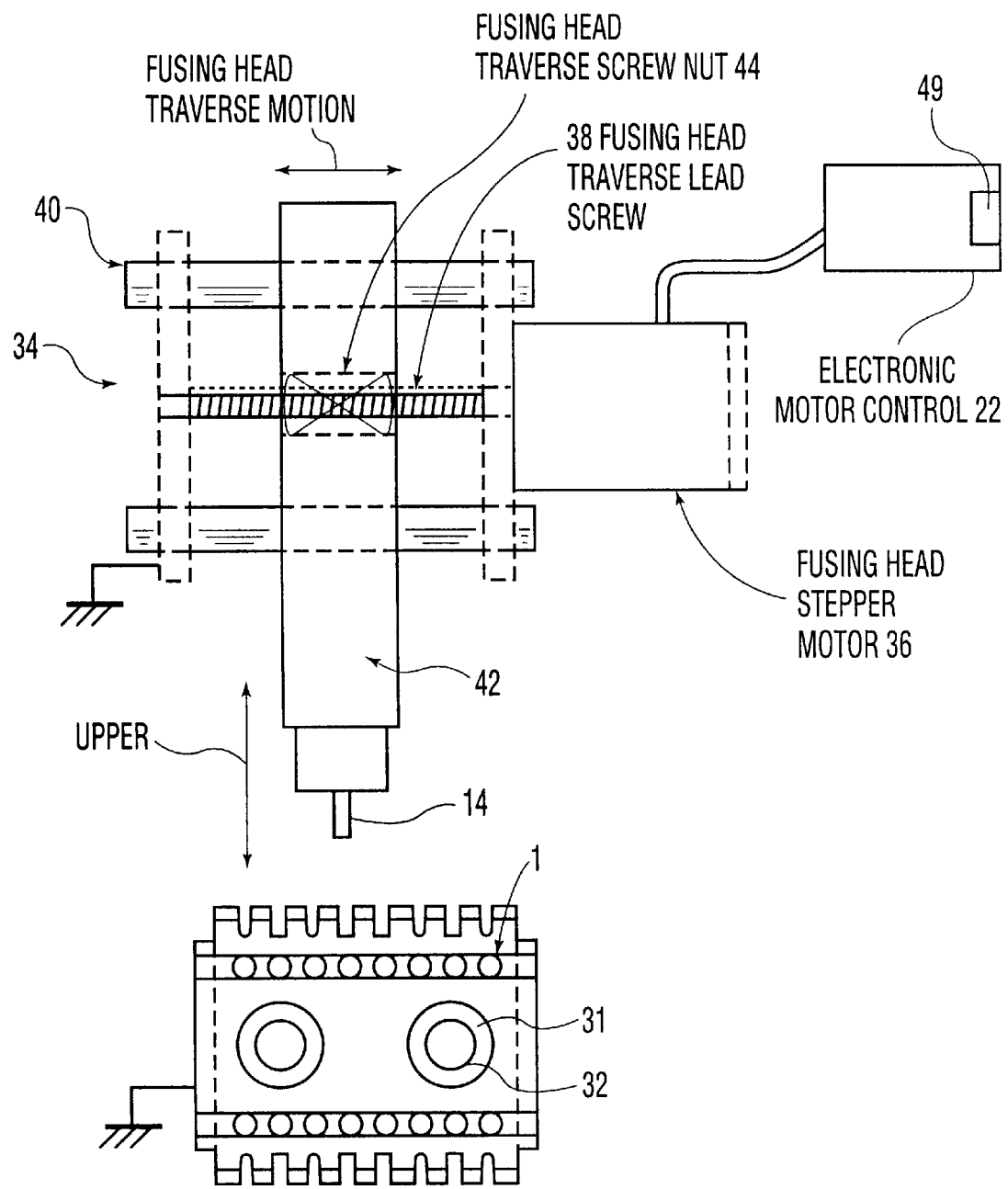

FIG. 12 is a diagrammatic front view of the transverse step positioning mechanism and upper and multi-lower electrodes according to the principles of the present invention.

DETAILED DESCRIPTION OF EXEMPLARY EMBODIMENT OF INVENTION

With reference to FIGS. 1–5, the system 10 for joining a wire to a pin according to the principles of the present invention includes lower fusing electrode 12 having side walls 13 defining a fusing notch or groove 15, an upper fusing electrode 14 mounted for vertical movement to contact elements in the lower portion of notch 15 and apply heat and current thereto as described below. Notch 15 and electrode 14 are symmetrically arranged generally as shown.

Insulated wire 16 is positioned at the bottom of notch 15 and includes a solid or stranded metal wire 17 surrounded by insulation 19. Wire 16 can be magnet wire or larger wire dimensions as desired. The pin 18 to be joined to wire 17 is positioned above wire 16 generally as shown. The dimensional relationship among the notch taper, slope of side walls, and notch dimensions of pin 18 and gauge and characteristics of wire 16 such that wire 16 and pin 18 are initially vertically spaced from each other preferably a known distance "D" and the notch 15, pin 18, wire 16 and electrode 14 are easily symmetrically oriented. With this arrangement, and pin 18 dimensioned wider than electrode 18, only the lower edges of pin 18 contact the sidewalls 13 for making an initial electrical and heat conduction path to the lower electrode.

During operation, with the parts so positioned, electrode 14 descends to make initial contact with the top surface of pin 18. As is well known with fusing machines, such as the Model 80, JOYAL Products, Inc., shown in U.S. Pat. No. 4,371,772, issued Feb. 1, 1983, the electrode 14 builds pressure on pin 18 and when a predetermined pressure is reached switch 20 is closed to apply a predetermined current value to the secondary of transformer 23. This initial current flows evenly through electrode 14 and the parts of pin 18 in contact with side walls 13 and through the solid portion of electrode 12 near the bottom of notch 15 to ground. See FIG. 4.

This initial current passing through electrodes 14 and 12 heats them such that heat is evenly applied to each of pin 18 and insulated wire 16. Heat from electrode 14 applied to pin 18 softens pin 18, and the electrode 14 pressure begins to drive pin 18 downward. The heat and current flowing in electrode 12 near notch 15 begins to burn off or flash vaporize insulation 19 about wire 16. This burning or vaporizing of insulation 19 is aided by current and heat passing through pin 18 as it is driven further downward and makes greater contact with walls 13. It is preferable that substantially all the insulation 19 is consumed by the time pin 18 makes contact with wire 17, see FIG. 5. To accomplish this, the initial vertical distance D, see FIG. 1, between pin 18 and insulated wire 16 is predetermined to enable complete insulation consumption before pin 18 and wire 17 make contact This is readily accomplished because the initial dimensions of pin 18 and the gauge of wire 16 are known. D, then, is determined by the shape of the bottom of walls 13 and the outward slope of walls 13. See for example, FIGS. 8A, B and C for various shape and dimenions of lower eletrode 12 for the pin dimensions and wire gauges mentioned in each Figure.

Figure 6:
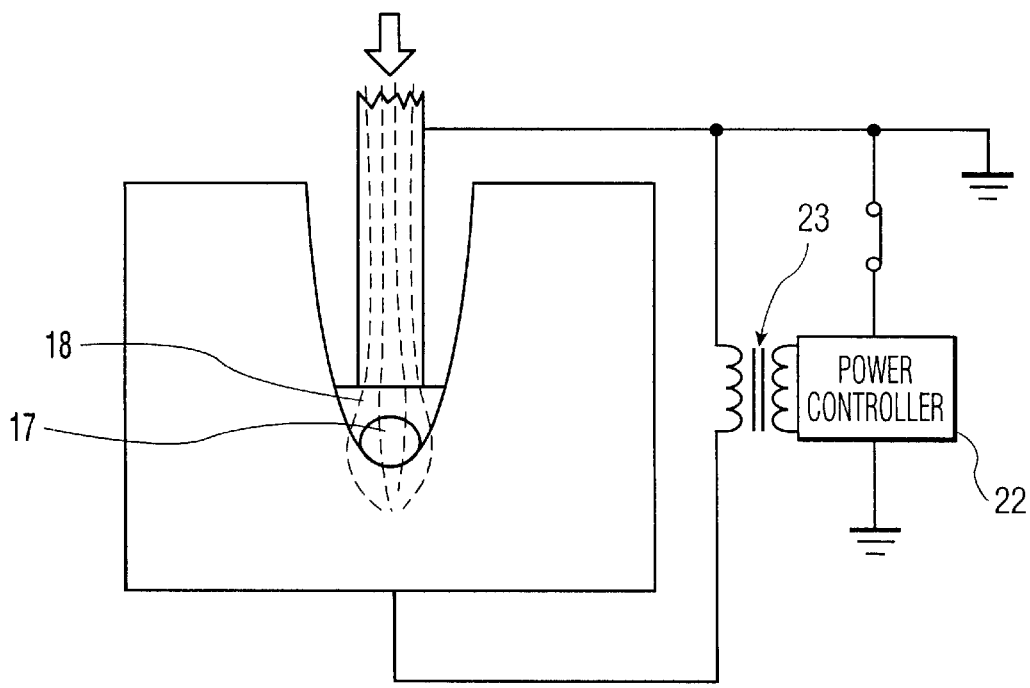
FIG. 6 is similar to FIG. 5 showing the parts fused together under pressure and current flow through the parts.

With the lower surface of pin 18 in contact with the upper surface of wire 17, current also flows through pin 18 and wire 17 thence through the bottom of notch 15. Electrode heat, pressure, and current applied to both pin 18 and wire 17 further soften these parts and the electrode pressure and confining groove aid in fusing the pin and wire into a reliable compression or fused joint. See FIG. 6.

Figure 7:
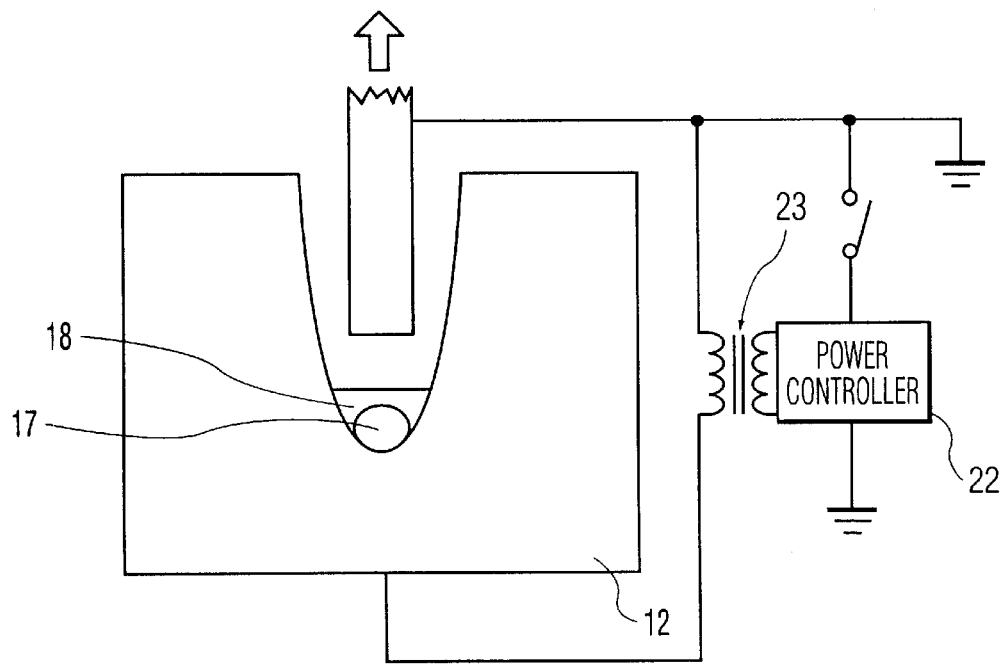
FIG. 7 is similar to FIG. 6 showing the withdrawal of the upper electrode.

Once the joint is made, controller 22 stops the application of current, and electrode 14 is withdrawn. The joined parts can then be removed from electrode 12. See FIG. 7.

An automatic system for fusing sequentially and a plurality of wires and pins is also provided according to a further aspect of the present invention. For this purpose, the lower electrode has a multiplicity of notches to receive simultaneously a plurality of pins and wires. One example of this configuration is shown in FIGS. 9–12 wherein lower electrode 12 includes eight transversely spaced fusing notches 15 along the top of bottom electrode 12. The fusing notches can be shaped as described above and have bevelled corners generally as shown to aid in installation.

The solid portions of electrode 12 between fusing notches 15 can define additional, non-fusing notches 30 which function to seat pins to which wire joints are not desired. Alternately, as shown in FIG. 12, all notches may be fusing notches if desired for the particular work piece. In either case, the lower multi-electrode preferably defines a transverse channel 56 on its front and/or back face. In addition, electrode 12 further defines a series of openings 58 extending through to the front and back faces of electrode 12. Each opening 58 is located preferably below each fusing notch and, if electrode 12 includes channel(s) 56, in communication therewith. Channel(s) 56 and openings 58 function to aid in concentrating the fusing heat and current at the bottom groove of the respective fusing notch during the fusing action. Electrode 12 can be releasably installed on a frame and beneath the zone of the upper electrode 18 with any fasteners such as by bolts (not shown) through bolt head seats 31 and openings 32.

The fusing machine further includes a fusing head fame assembly 34 that includes a stepping or other suitable motor 36 to control a traverse lead screw 38 mounted for rotation on frame 40. The fusing head can include any conventional air-cylinder, ball screw, or other vertically movable head assembly 42 operated in the standard manner to apply vertical motion, pressure, heat and current to electrode 18 as described above. Assembly 42 further includes a transverse head screw nut 44 threaded on to screw 38 so that precise rotation of stepper motor 36 precisely moves and positions electrode assembly 42 and electrode 18 over any predetermined one of the fusing notches 15. Electronic controller 22 can be easily programmed to control stepper motor 36 in coordination with the application of fusing current as described above.

Figure 1:
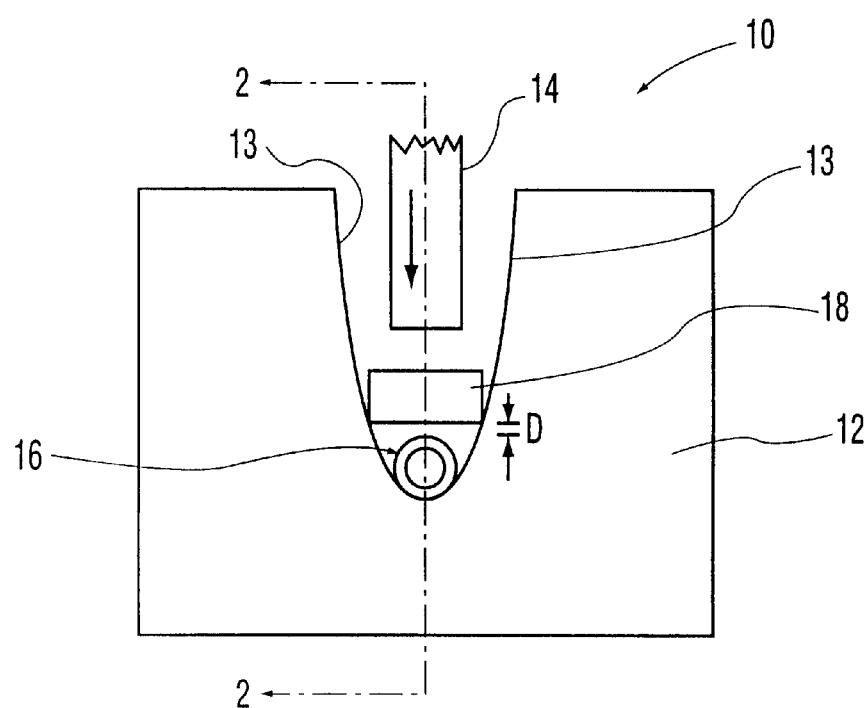
FIG. 1 is a diagrammatic from elevation of the fusing electrodes, pin and wire of one exemplary embodiment of the invention.
Figure 2:
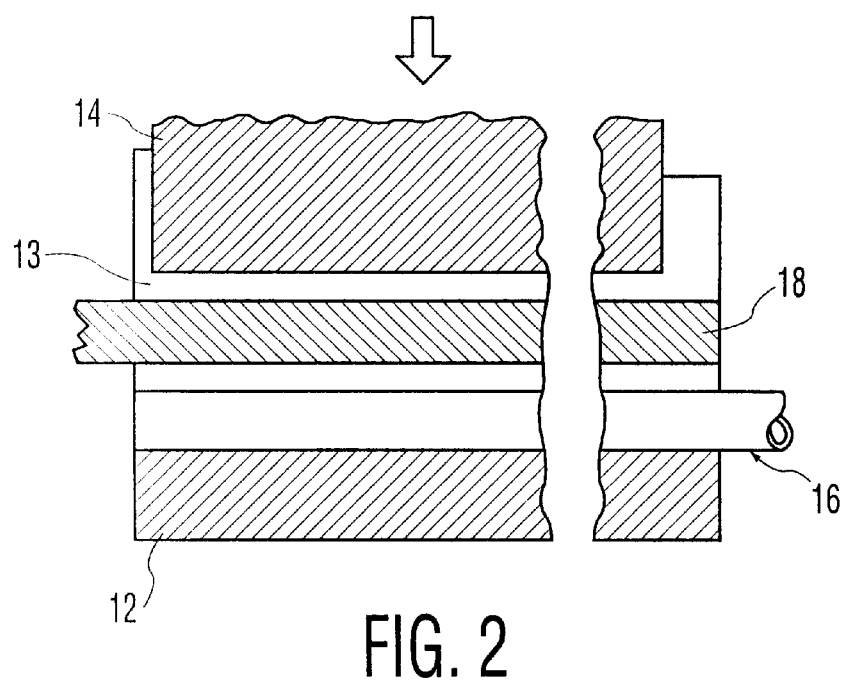
FIG. 2 is a side section taken along line 2—2 of FIG. 1.
Figure 3:
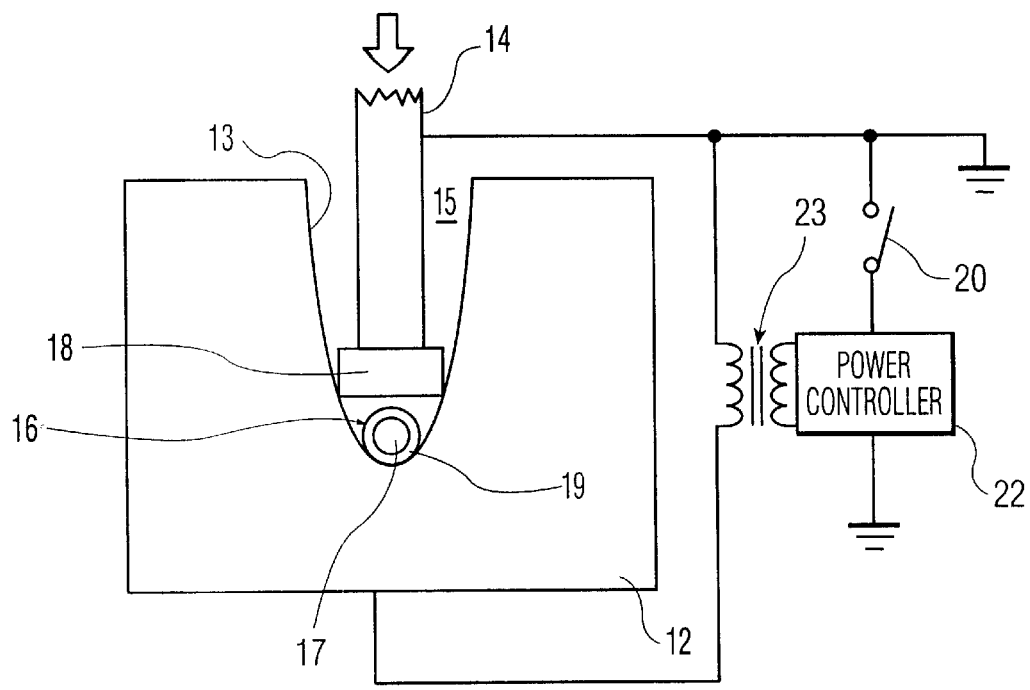
FIG. 3 is similar to FIG. 1 after the upper electrode engages the pin and also showing the power controller.
Figure 4:
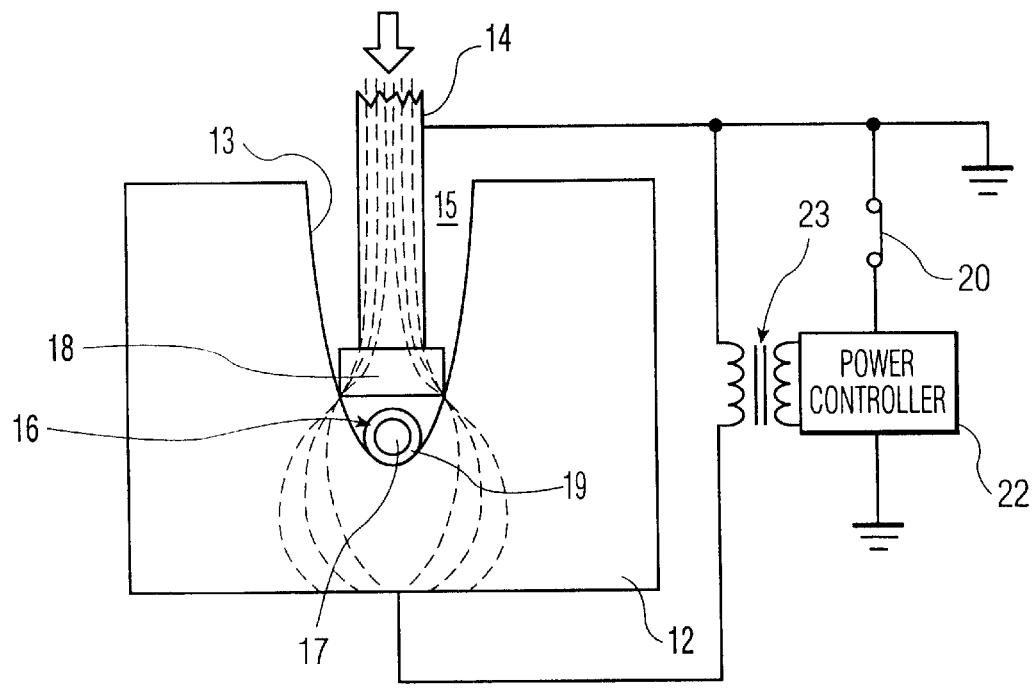
FIG. 4 is similar to FIG. 3 showing the flow of initial current through the parts.
Figure 5:
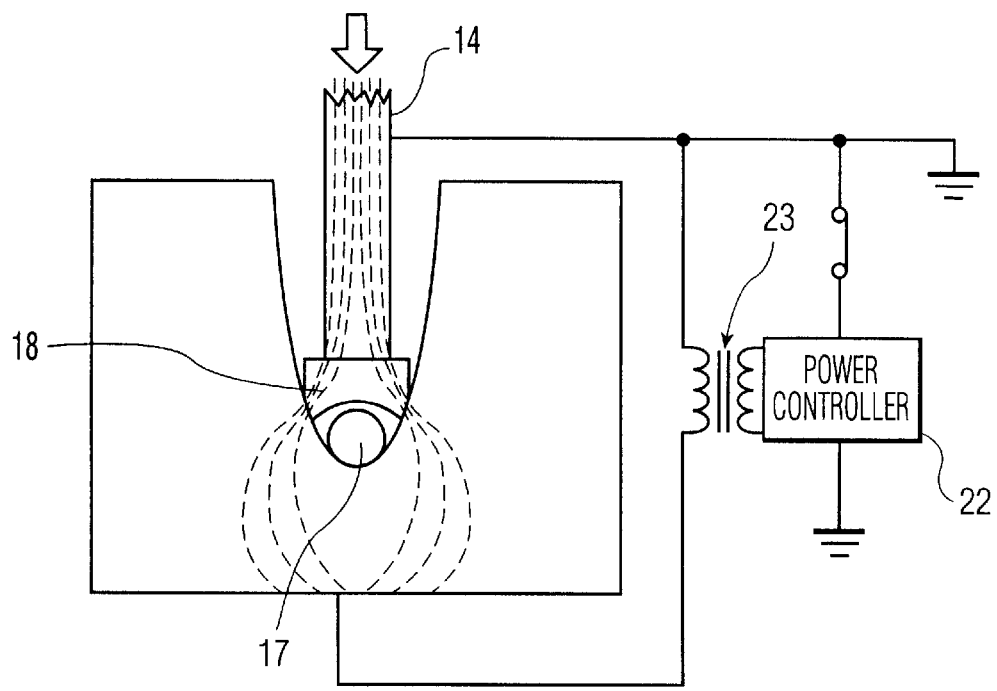
FIG. 5 is similar to FIG. 4 showing the parts after the wire insulation is burned away.

In operation, the lower electrode is installed on the machine with the predetermined notches facing the upper electrode for the predetermined pins and wires sizes to be fused. The operator lays a predetermined number of insulated wires 16, e.g. four wires, into the four fusing notches 15 of electrode 12. A fixture (not shown) can be provided to hold each wire positioned in each notch. Next a device 50 having, for example, four pins is placed in a fixture or other apparatus (not shown) and the operator directs each pin into a respective fusing notch generally as shown in FIG. 1. With all pins and wires so positioned, the operator hits a start-button 49 coupled to controller 22 to initiate the sequential fusing operation. Motor 36 then positions electrode 18 over, for example, the left-most notch 15 in FIG. 12. So positioned, electrode 18 is driven downward to contact pin 18 (see FIG. 1) and the fusing sequence described above is implemented. After electrode 18 is withdrawn, see FIG. 7, and the electrode clears the top of notch 15, motor 36 moves electrode 18 to a position over the second left most notch 15 in FIG. 12 that contains a wire/pin assembly. The fusing action described above is then repeated. This stepping and fusing sequences are then repeated under automatic control of controller 22 until all pins and wires are fused and electrode 18 withdrawn to a suitable position above electrode 12. The operator can then remove the work pieces and set up the next series of wires and pins to be fused.

The electrodes 12 of FIGS. 9–12 include a row of notches on their top and bottom edges so that electrode 12 can fuse one series of wire, pin sizes on one edge and then we turned over to fuse a set of different wire/pin sizes on the other edge.

It will be understood that the present invention has utility for magnet wire/pin joints as well as uninsulated wire/pin joints and other insulated wire/pin dimensioned joints. If desired, the system of FIG. 12 can be modified to provide a stationary upper electrode head on the frame and the work pieces and lower electrode can be mounted for indexed movement on the frame in responses to a stepper or other suitable motor. Also, it will be understood that various modifications and changes can be made to the exemplary embodiments disclosed herein without departing from the spirit and scope of the present invention.

We claim:

1. A method of fusing a pin and a wire to reliably form a good quality fusion joint comprising:

placing the pin and wire in a notch of a lower fusing electrode so that the pin is initially held by the lower electrode in spaced relation to the wire, contacting the pin with an upper fusing electrode, applying fusing current through the upper electrode, pin and portion of the lower electrode in contact with the wire to heat the upper electrode and said portion, transferring the heat from said upper electrode to the pin and from said portion to the wire prior to the pin making contact with the wire, moving said upper and lower electrodes relatively toward each other to apply fusing pressure to and current through the heated pin and wire, whereby the heated wire and pin are squeezed together to form a fused joint.

2. A method of fusing a pin and a wire according to claim 1, wherein the fusing current is applied substantially symmetrically through the pin and portion.

3. A method of fusing a pin and a wire according to claim 1, wherein the fusing heat is applied symmetrically through the pin and portion.

4. A method of fusing a pin and a wire according to claim 1, wherein heat is applied symmetrically to the wire by the portion.

5. A method of fusing a pin and a wire according to claim 1, wherein said notch is symmetrical and includes outwardly sloping side walls and said pin is held symmetrically by the notch side walls contacting the pin.

6. A method of fusing a pin and a wire according to claim 5, wherein said wire is of a predetermined gauge and said pin is of a predetermined dimension and said notch walls are selected to initially hold the wire and pin a predetermined distance from each other.

7. A method of fusing a pin and a wire according to claim 1, wherein said wire is initially insulated and said transferring step includes burning or vaporizing the wire insulation within the notch prior to the pin making contact with the wire.

8. A method of fusing a pin and a wire according to claim 7 wherein transferring step includes applying heat from the portion to the insulated wire to initiate symmetrical burning or vaporizing of the insulation about the vertical axis plane of the notch.

9. A product made by the method of claim 1.

10. A product made by the method of claim 8.

* * * * *